United States Patent [19]

Buchholz et al.

[11] Patent Number: 5,493,569

[45] Date of Patent: Feb. 20, 1996

[54] METHOD AND APPARATUS FOR REDUCING THE LIKELIHOOD OF CONTENTION AND RESOURCE MISALLOCATION IN A PACKET TRANSMISSION SYSTEM

[75] Inventors: Dale R. Buchholz, Palatine; William K. Doss, Lake In The Hills; Karen E. Robbins, Lake Zurich; R. Lee Hamilton, Jr., Palatine, all of Ill.

[73] Assignee: Motorola Inc., Schaumburg, Ill.

[21] Appl. No.: 394,939

[22] Filed: Feb. 27, 1995

Related U.S. Application Data

[63] Continuation of Ser. No. 30,957, Mar. 12, 1993, abandoned.

[51] Int. Cl.$^6$ ............................................ H04J 3/16
[52] U.S. Cl. ............................ 370/85.7; 370/95.3
[58] Field of Search .................... 370/95.1, 95.3, 370/110.1, 85.6, 85.7, 85.8, 85.2; 340/825.5, 825.08, 825.51; 455/33.1, 34.1, 54.1, 56.1; 379/60

[56] References Cited

U.S. PATENT DOCUMENTS

| | | | |
|---|---|---|---|
| 4,742,512 | 5/1988 | Akashi et al. | 370/104.1 |
| 4,763,320 | 8/1988 | Ruldolph et al. | 370/95.1 |
| 4,882,730 | 11/1989 | Shinmyo | 370/104.1 |
| 4,982,400 | 1/1991 | Ebersole | 370/74.3 |
| 5,008,883 | 4/1991 | Eizenhofer et al. | 370/95.1 |
| 5,132,680 | 7/1992 | Tezuka et al. | 370/85.8 |
| 5,172,375 | 12/1992 | Kou | 370/104.1 |

*Primary Examiner*—Douglas W. Olms
*Assistant Examiner*—Chau T. Nguyen
*Attorney, Agent, or Firm*—ValJean Hillman

[57] ABSTRACT

A packet transmission system (100) for reducing request traffic contention and the likelihood of resource misallocation includes a communications controller (110) and a plurality of remote requesting units (112) requesting packet transmission services. In response to receipt of a request (302), the controller (110) transmits a grant (306) to a requesting unit (112) when packet transmission resources (304 & 310) are available or a request acknowledgment (306) when packet transmission resources (304 & 310) are unavailable. Each remote unit (112) comprise apparatus structure and method steps for transmitting requests (302) to the controller (110) and starting a first timer having an interval (T) determined as a function of a number (Q) of outstanding requests (302). Upon receipt of an acknowledgement (306), the remote unit (112) starts a second timer having an interval ($T_1$) longer than the interval (T). Upon expiration of either the first timer or the second timer, the remote unit (112) will then and only then transmit a duplicate request (302). By limiting the number of duplicate requests transmitted by a remote unit (112), the present invention operates to reduce request traffic contention and the likelihood of resource misallocation.

18 Claims, 6 Drawing Sheets

L = LENGTH OF QUEUE

METHOD AND APPARATUS FOR REDUCING THE LIKELIHOOD OF CONTENTION AND RESOURCE MISALLOCATION IN A PACKET TRANSMISSION SYSTEM

This is a continuation of application Ser. No. 08/030,957, field Mar. 12, 1993 and now abandoned.

FIELD OF THE INVENTION

This invention is directed to a packet transmission system. In particular, this invention relates to a method and apparatus for reducing request traffic contention and ultimately the likelihood of resource misallocation within a packet transmission system.

BACKGROUND OF THE INVENTION

Packer transmission service has been in use for some time and has traditionally been employed within communication systems such as wireless and wire line voice and/or data communications. Packet transmission service has also been used in association with digital communication systems which permit the efficient allocation of system resources via any of the well known access schemes, such as, for example, Time Division Multiple Access (TDMA), Frequency Division Multiple Access (FDMA), Code Division Multiple Access (CDMA) or any combination thereof. As will be appreciated, system resources may comprise radio frequency spectrum divided into communication channels to facilitate the transmission of user information.

In a digital packet transmission system, there are several access procedures a requesting unit can initiate when attempting to obtain and utilize system resources. These access procedures inform the system which type of operation a requesting unit is attempting to perform. Such operations include but are not limited to, call origination, location reporting, registration and page response.

The typical access procedure may be summarized as follows. A requesting unit transmits a system access request (request) over a request channel to a communications controller, starts a retry timer, and awaits a bandwidth grant message from the controller, informing the unit when and which channel is available for use. If the communications controller fails to respond to the request before the retry timer expires, the requesting unit will reissue the request (duplicate request). This procedure will continue until the requesting unit either receives a valid assignment of a resource (bandwidth grant), reaches a maximum number of retries, or a packet lifetime timer expires, informing the requesting unit to cease.

In a TDMA system, several requests may be received by the controller per TDMA frame. These requests are stored in memory (queued) until time slots available to satisfy the requests are allocated. For identification purposes, each requesting unit's request contains identification information. Therefore, a communications controller receives specific information with which to distinguish one unit's access request from that of another. Requests, however, typically do not contain information permitting the controller to distinguish a requesting unit's requests one from another. Thus, whenever a requesting unit retransmits its request there is no means for the controller to determine whether the received request is the unit's first or a subsequent attempt. Accordingly, the above described scenario is extremely susceptible to the misallocation of system resources.

If the controller fails to respond to a requesting unit's initial request within the retry interval, the requesting unit will issue a duplicate request. Since the controller receives no information regarding the relationship of the duplicate request to other requests, the controller is unable to correlate the duplicate request with a request already in progress. This may result in the controller processing both requests and allocating duplicate resources for the same requesting unit. Since the requesting unit will respond to the first bandwidth grant received, all subsequent granted resources will go unused and result in a waste.

The occasional misallocation of such a resource is not catastrophic to system performance, since the unused resource will eventually be returned to service. However, the increased occurrence of misallocation, or misallocation during periods of heavy use presents a formidable obstacle to the efficient operation of a modern digital communication system. It would be extremely advantageous therefore to provide a method and apparatus for limiting the number of duplicate access requests transmitted by a remote unit in order to reduce request traffic contention and ultimately reduce the likelihood of resource misallocation in a digital communication system.

SUMMARY OF THE INVENTION

Figure 1:
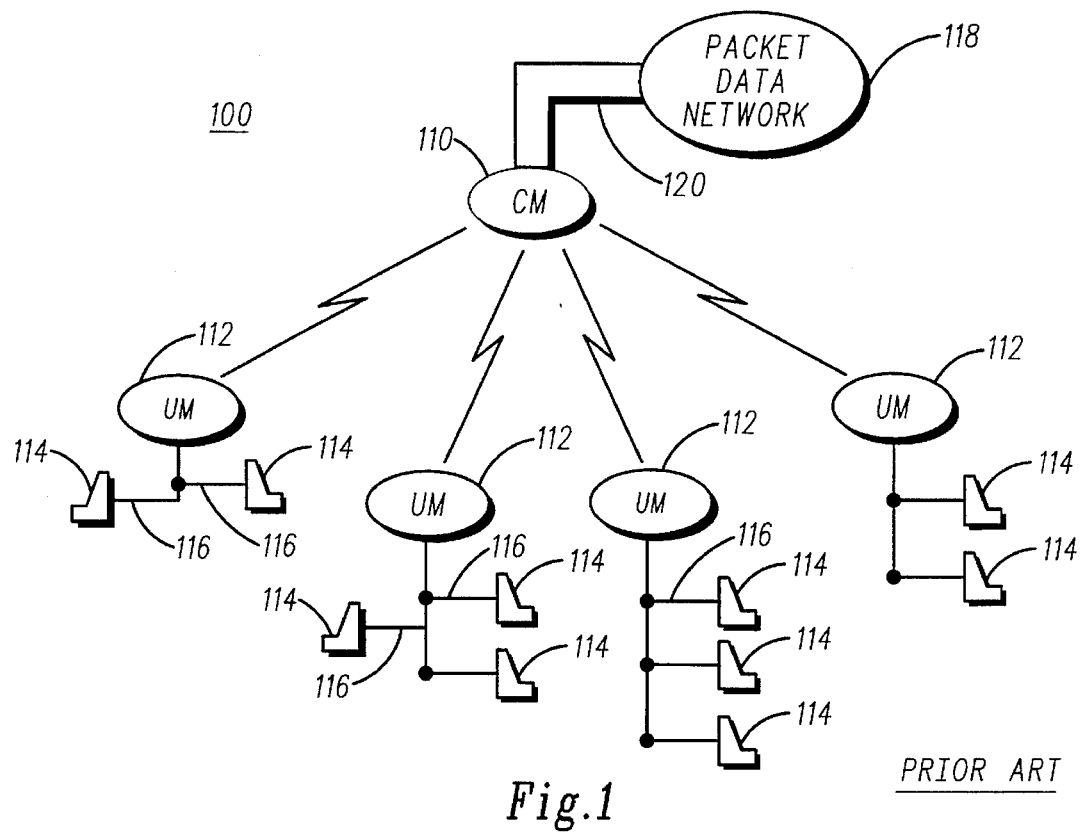
FIG. 1 is a block diagram of an RF packet transmission system.

Briefly described, the present invention is a method and apparatus for reducing the likelihood of request traffic contention and resource misallocation in a packet transmission system wherein a plurality of remote units request packet transmission services from a communications controller by transmitting requests to said communications controller. Each remote unit comprises apparatus structure and method steps for transmitting requests to the communications controller and setting a first timer interval as a function of a number of outstanding requests. Upon receipt of an acknowledgement, the remote unit sets a second timer interval having a duration longer than the first timer interval. As a function of the expiration of either the first or the second timer interval, the remote unit will then and only then transmit a duplicate request. By limiting the number of duplicate requests transmitted by a remote unit, the present invention reduces the likelihood of request traffic contention.

The communications controller comprises apparatus structure and method steps for receiving and storing requests from remote units. In response to the receipt of a request, the controller either transmits a grant to the remote unit when communication resources are available or it transmits an acknowledgment when resources are currently unavailable. Utilization of an acknowledgement when resources are not immediately available reduces the likelihood of resource misallocation.

DETAILED DESCRIPTION OF A PREFERRED EMBODIMENT

With reference to the present invention, the setting of a remote unit's retry interval relatively short will protect a packet transmission system from those delays associated with lost or unintelligible service requests. Unfortunately, short retry intervals expose the packet transmission system to those problems associated with the issuance of duplicate requests (i.e., request channel collisions and possible resource misallocation). While lengthening the remote unit retry interval tends to reduce the likelihood of duplicate requests, it nonetheless tends to expose the packet transmission system to unacceptable delays if and when initial requests are lost or unintelligible at the communications controller.

In order to minimize the likelihood that a remote unit will issue a duplicate request when its initial request is received and to assure a quick turnaround time when it is not, the present invention permits the communications controller, in response to receipt of a request, to either transmit a grant to the remote unit when packet transmission resources are immediately available or to transmit an acknowledgment to the remote unit when packet transmission resources are not currently available. Upon receipt of an acknowledgement, the remote unit sets a grant timer interval. By design, the grant timer interval is longer than the retry interval. Upon expiration of either the retry interval or the grant timer interval, the remote unit will then and only then transmit a duplicate request.

The introduction of the request acknowledgment from the communications controller (verification of receipt of initial request) and utilization of a longer grant time interval provides the packet transmission system with protection from request traffic collisions and resource misallocations during periods of heavy use. The remote unit retry interval can now be set relatively short in order to provide the packet transmission system with quick turnaround protection.

The present invention has application within the field of wireless and wire line packet transmission systems. FIG. 1 illustrates a radio frequency (RF) packet transmission system 100 comprising a wireless local area network (LAN) in which control module (CM) 110 utilizes RF communications to communicate with a plurality of user modules (UM) 112. Each UM 112 is connected to one or more user devices 114 such as a terminal, personal computer or other information input/output device. The CM 110 is connected to packet data network 118 by data channel 120 which may include, but is not limited to wires or optical links.

CM 110 controls communications within the illustrated network and passes information from data network 118 to user devices 114 via an associated UM 112. CM 110 also controls local communications by receiving information from one UM 112 and relaying the information to a different UM 112. Data network 118 may consist of an Ethernet network, a Token Ring network, or any of the other of the well known data networks. Information passed between CM 110 and UMs 112 is in the form of packets as will be discused below.

Figure 2:
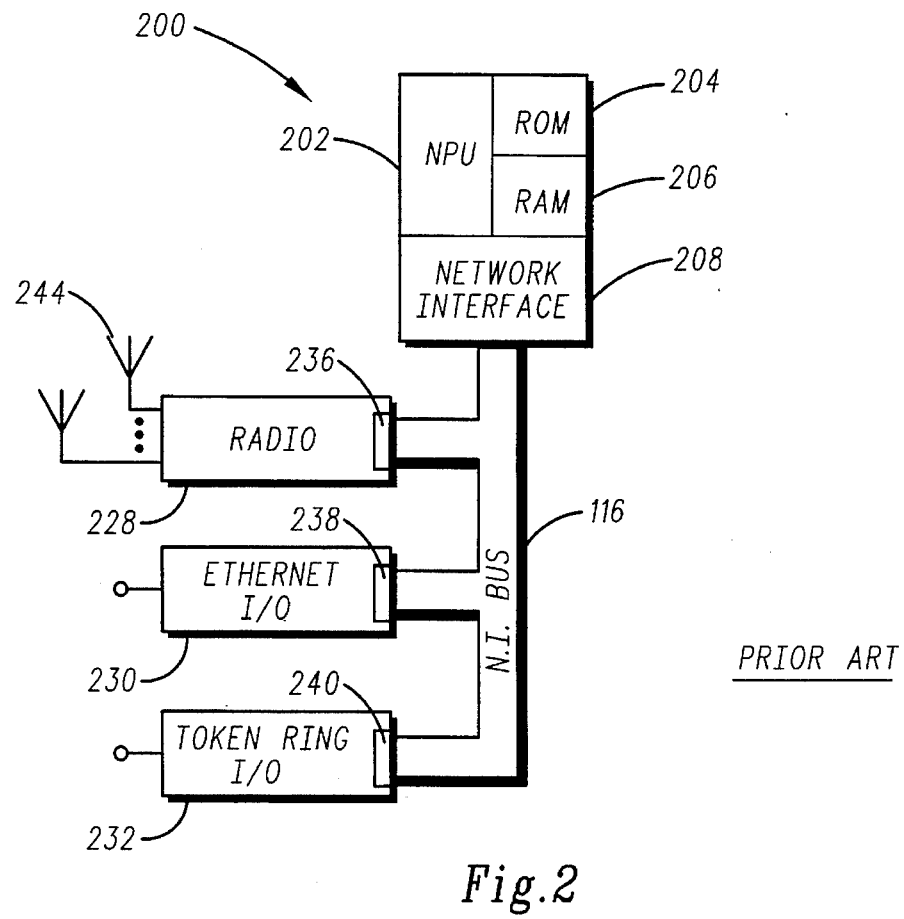
FIG. 2 is a block diagram of a user module and a control module as shown in FIG. 1.

FIG. 2 is a block diagram illustrating a user module 112 as shown in FIG. 1. A communications controller 200 includes a microprocessor 202, with associated read only memory 204, random access memory 206 and a network interface 208. The network interface 208 consists of appropriate registers and line drivers for communication with various peripheral devices.

A plurality of such devices including two-way radio 228, an Ethernet I/O device 230, and a Token Ring I/O device 232 are shown connected to UM 112 via the bus 116. Each peripheral 228–232 contains a bus interface 236, 238, and 240, respectively. These interfaces provide the necessary registers and line drivers for communicating on the bus 116 and will also include an MPU, RAM, and ROM if these resources are not available in the integrated devices.

The radio 228 includes one or more antennas 244 for RF communications with CM 110 as shown in FIG. 1. The other illustrated peripherals, such as, for example, Ethernet I/O device 230 and Token Ring I/O device 232 are merely representative that virtually any type of packetized information can be coupled by means of an appropriate input/output device to UM 112. Each CM 110 will also take the configuration of FIG. 2.

While the preferred embodiment shows a Network Interface (NI) bus 116 connecting the various peripherals to the communications controller 200, it will be appreciated that the NI bus 116 can be substituted by a TDM bus, bi-directional bus or packet switch which are all known in the art.

Figure 3:
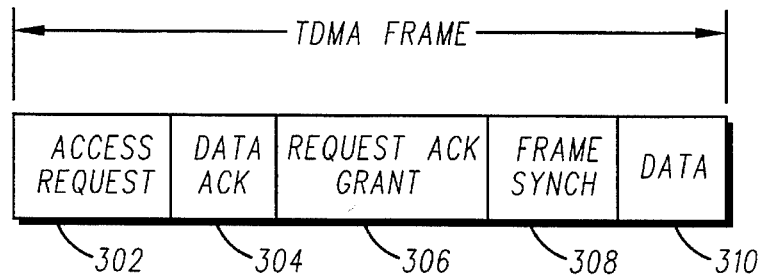
FIG. 3 depicts the TDMA frame structure utilized by RF packet transmission system of FIG. 1.

FIG. 3 depicts the TDMA frame structure utilized by the RF packet transmission system 100 of FIG. 1. As shown the frame structure 300 comprises Access Request field 302, Data_Ack field 304, Request_Ack or Grant field 306, Frame Synchronization field 308, and Data field 310. Each TDMA frame in accordance with the present invention is 2 msec in length.

Access Request field 302 comprises a number of TDMA time slots, used by UMs 112 to send requests to CM 110 for access to data time slots within the Data field 310. In accordance with the preferred embodiment, there are twelve (12) time slots within Access Request field 302. The allocation of these communication resources may vary depending upon the particular application.

Data_Ack field 304 comprises a number of TDMA time slots used by both CM 110 and UMs 112 to send an acknowledgement (data_ack) for data packets received in the Data field 310 of the previous TDMA frame. In accordance with the preferred embodiment there are four (4) of these time slots available. Two (2) are allocated for UM to CM transmissions, the remaining two (2) are dedicated for CM to UM transmissions.

Request_Ack/Grant field 306 comprises two (2) TDMA time slots used by CM 110 to send either a request acknowledgement (request_ack) or a bandwidth grant indication to the UMs 112. A bandwidth grant directs a UM 112 to utilize specific ones of the data time slots in Data field 310. A request_ack directs a UM 112 to take alternate action as described herein below until a resource (data or data_ack time slot) becomes available. As such, the resources reserved to the Request_Ack/Grant field 306 have a dual function.

Frame Synchronization field 308 comprises three (3) TDMA time slots used by the CM 110 to broadcast frame synchronization information to all UMs 112 within the CM 110 zone of coverage. UMS 112 use this information to synchronize their TDMA frames with those of CM 110 and to evaluate the signal quality of the communications paths between themselves and CM 110.

Data field 310 comprises a number of TDMA time slots used by both the CM 110 and the UMs 112 to send data. In accordance with the preferred embodiment, there are four (4) such time slots available per TDMA frame. It will be appreciated by those skilled in the art that these 4 time slots can be allocated in a variety of ways depending upon the particular application employed. It will also be appreciated that the order in which the above fields appear in TDMA frame 300, as well as the number of time slots per field, may vary without departing from the spirit of the present invention.

Figure 4:
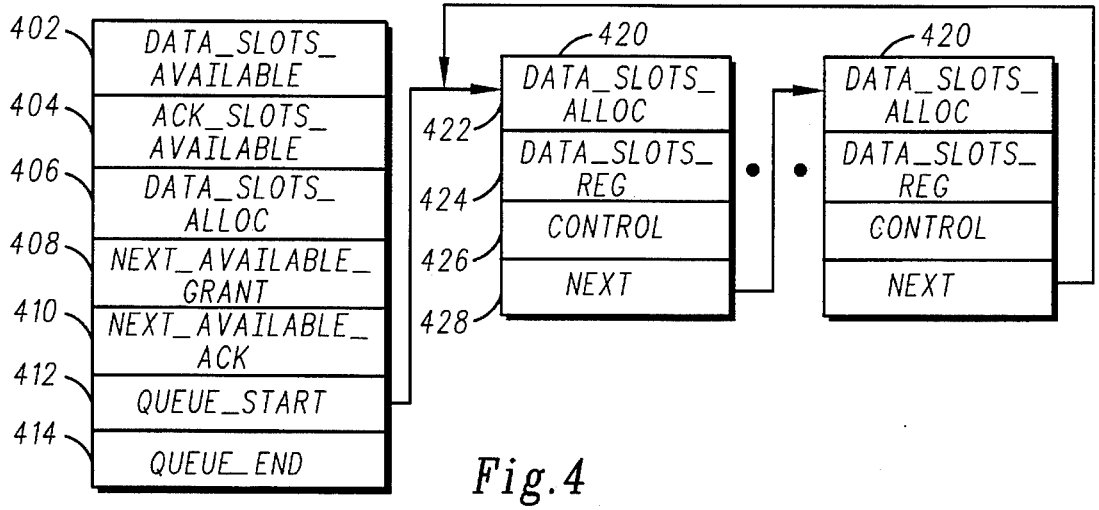
FIG. 4 depicts the structure of a Frame Control Block in accordance with the present invention.

CM 110 maintains a RAM 206 data structure shown in FIG. 4 and referred to as a Frame Control Block (FCB). FCB 400 permits CM 110 to manage the allocation of the above mentioned communication resources on a frame-by-frame basis. As depicted, FCB 400 may consist of the following fields of information. Data_Slots_Available field 402 contains information on how many data time slots are available for allocation in a current frame. Ack_Slots_Available field 404 contains information on how many data_ack time slots in the following frame are available for allocation. Data_Slots_Allocated field 406 contains information on how many data time slots in the current frame have been allocated. Next_Available_Grant field 408 contains identification of the next grant time slot available for transmission of a bandwidth grant or request_ack in accordance with the present invention. Next_Available_Ack field 410 contains identification of the next data_ack time slot available for assignment.

Queue_Start and Queue_End fields 412 and 414 point to respective request structures 420 within a circular linked list in RAM 206 of FIG. 2. Each request structure 420 contains the information necessary to schedule TDMA frame resources in response to a single request. As depicted, request structure 420 may consist of the following fields of information. Data_Slots_Alloc field 422 contains the number of data time slots in the current frame which have been allocated to this request. Data_Slots_Req field 424 contains the number of data time slots required in the next frame to complete the current request. Control field 426 contains an index to control information to be appended to the grant or request acknowledgement transmission. Next field 428 contains an index to the next request structure 420 in the linked list.

Queue_Start field 412 points to the first list structure 420 comprising information for scheduling resources for transmission of data. Queue_End field 414 points to the first empty list structure 420 available for maintaining new request scheduling information. If the Queue_Start and Queue_End fields point to the same location, the queue is empty.

In accordance with the preferred embodiment, each received request is mapped into a corresponding request structure 420 by the MPU 202 of FIG. 2

Figure 5:
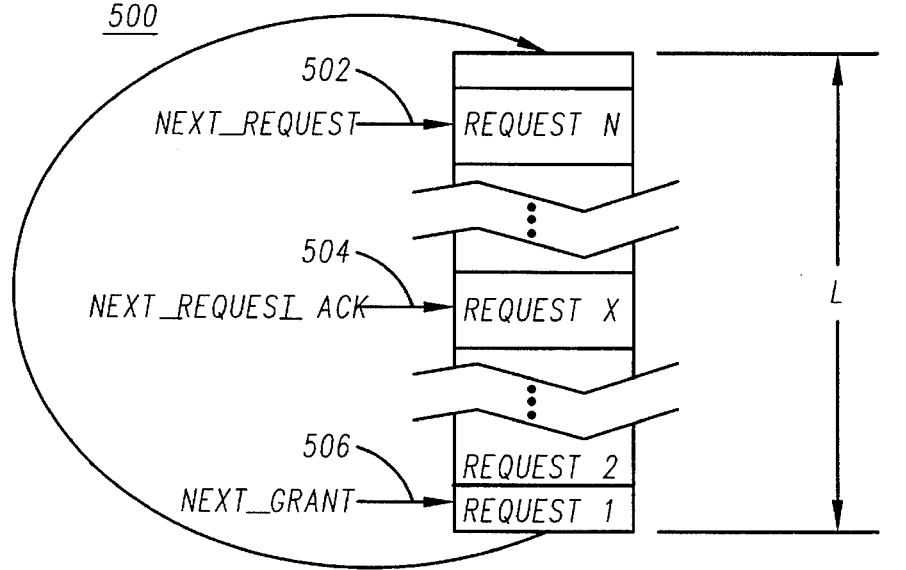
FIG. 5 depicts the structure of a request queue in accordance with the present invention.

In accordance with the present invention, each incoming request is stored in memory. FIG. 5 depicts the structure of a CM 110 request queue 500. As will be appreciated, request queue 500 is maintained in RAM 206. During operation, the first request received by CM 110 is stored in the queue in a first in, first out (FIFO) fashion at a location indexed by the Next_request pointer 502. Each successive request is stored in the queue at successive memory locations. In accordance with the preferred embodiment, the request queue has a length L wherein no more than 6 requests are stored in the queue at any one time. By maintaining a relatively short queue length, it is possible to limit the duration of both the request and grant retry intervals, thereby reducing the delay associated with lost requests and/or grants.

Queue 500 maintains in addition to Next_request pointer 502 a Next_request_Ack pointer 504. The purpose of this pointer is to identify the oldest UM request which has not been acknowledged. When available, an excess grant time slot will be used to send a request acknowledgement to the UM 112 which issued this request, thereby, informing the UM that its request has been received and that a resource (data time slot and data_ack time slot) is not currently available.

Finally, queue 500 comprises a Next_grant pointer 506 which indexes the oldest acknowledged request. When no requests have been acknowledged, the Next_request_Ack pointer 504 and the Next_grant pointer 506 will point to the same request. The purpose of the Next_grant pointer 506 is to index the next request which is to receive a bandwidth grant allocation.

Armed with the above information, CM 110, under the direction and control of system operating instructions stored in ROM 204 of FIG. 2, monitors the FCB to keep track of how many data, data_ack and grant time slots are available and/or allocated during a current frame. As long as there is at least one data time slot and one data_ack time slot available, CM 110 will grant resources to an incoming and/or queued request. Thus, at the start of each new frame, CM 110 reviews the FCB, removes any requests which have previously been serviced, schedules available data, grant and data_ack time slots for allocation and updates the number and type of time slots currently allocated.

Figure 6:
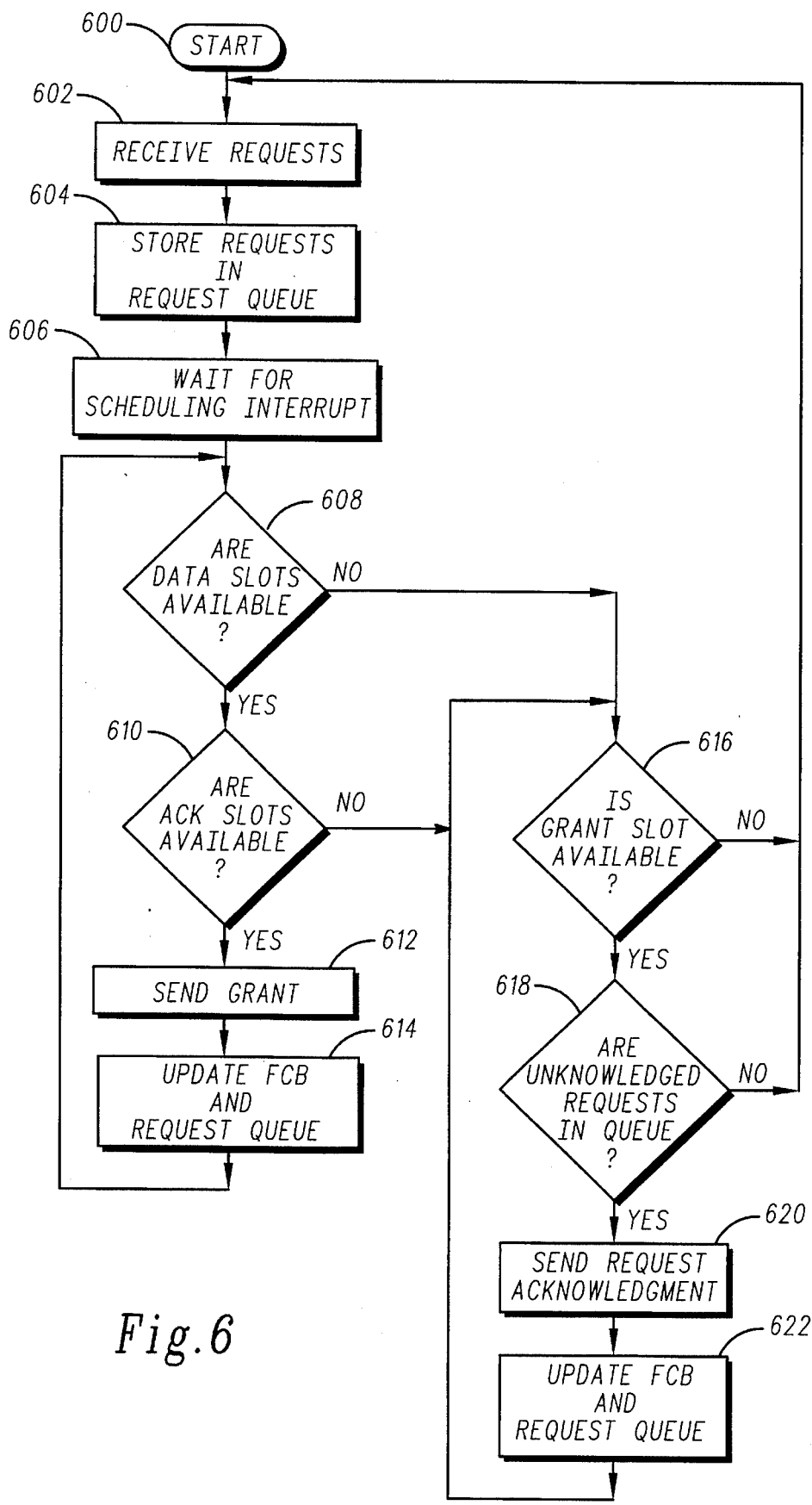
FIG. 6 is a flow chart diagram of the steps performed by the control module of FIG. 1 to schedule TDMA frame resources in accordance with the present invention.

FIG. 6 is a flow chart diagram of the steps performed by the communications controller 200 of CM 110 under the direction of operating system instructions stored in ROM 204 to schedule TDMA frame resource in accordance with the present invention. Commencing with start block 600 flow proceeds to block 602, where CM 110 receives requests from UMs 112. These requests are stored in request queue 500 of FIG. 5 at block 604. Flow proceeds to block 606 where the communications controller 200 waits for a scheduling interrupt. As previously mentioned, each TDMA frame 300 is 2 msec in length. At the start of each new frame, a scheduling interrupt is issued by the network interface device 208 of FIG. 2 which is designed to delimit TDMA frame 300 boundaries. The issuance of a scheduling interrupt from network interface device 208 informs the MPU 202 of controller 200 to begin the scheduling (allocation) of available frame resources.

At decision block 608 the communications controller monitors the FCB 400 of FIG. 4 to determine whether a data time slot is available for allocation. If so, flow proceeds to decision block 610 where the controller monitors the FCB to determine whether a data_ack time slot is available for allocation. If so, flow proceeds to block 612 where a grant time slot is scheduled for transmission to the requesting UM. At block 614, FCB 400, request structures 420 and request queue 500 are all updated to reflect the current frame's resource status. In this effort, the serviced request is now deleted from the request queue 500, its corresponding request structure 420 is returned to service, FCB fields 402–414 receive up-to-date resource status and the Next_grant pointer 506 of FIG. 5 is incremented to point to the next request available for receipt of a grant time slot.

Upon completion of all update activities at block 614, flow will branch back to decision block 608 where another data time slot and a data ack time slot are scheduled for allocation. This process will continue until all TDMA frame 300 data time slots 310 or data_ack time slots 304 have been allocated.

When all current frame data time slots or data_ack time slots have been allocated, flow will branch from decision block 608 or 610, to decision block 616, where a check is performed to determine whether a grant time slot 306, in the current frame, is available for allocation. If so, flow proceeds to decision block 618 where a check is performed to determine whether any unacknowledged requests are currently stored in the request queue 500. If such a request resides at the location indexed by Next_request_Ack pointer 504 of FIG. 5, then flow will proceed to block 620 where a grant time slot 306 is scheduled to transmit a request acknowledgement message to the requesting UM. At block 622 the FCB 400 of FIG. 4 and request queue 500 of FIG. 5 are updated in order to once again reflect the current frame's resource status. In this effort, FCB field 408 is modified to identify the next grant slot which can be used to send a bandwidth grant or request acknowledgement and the Next_request_Ack pointer 504 of FIG. 5 is incremented to point to the next unacknowledged request in the request queue.

Upon completion of all update activities at block 622, flow will branch back to decision block 616 where all remaining grant time slot are scheduled for transmission of request acknowledgments. When all grant time slots 306 have been allocated, or when no unacknowledged requests remain in the queue, flow will branch from decision block 616 or 618 back to block 602 where the above described scheduling process will be repeated for the next TDMA frame.

Figure 7:
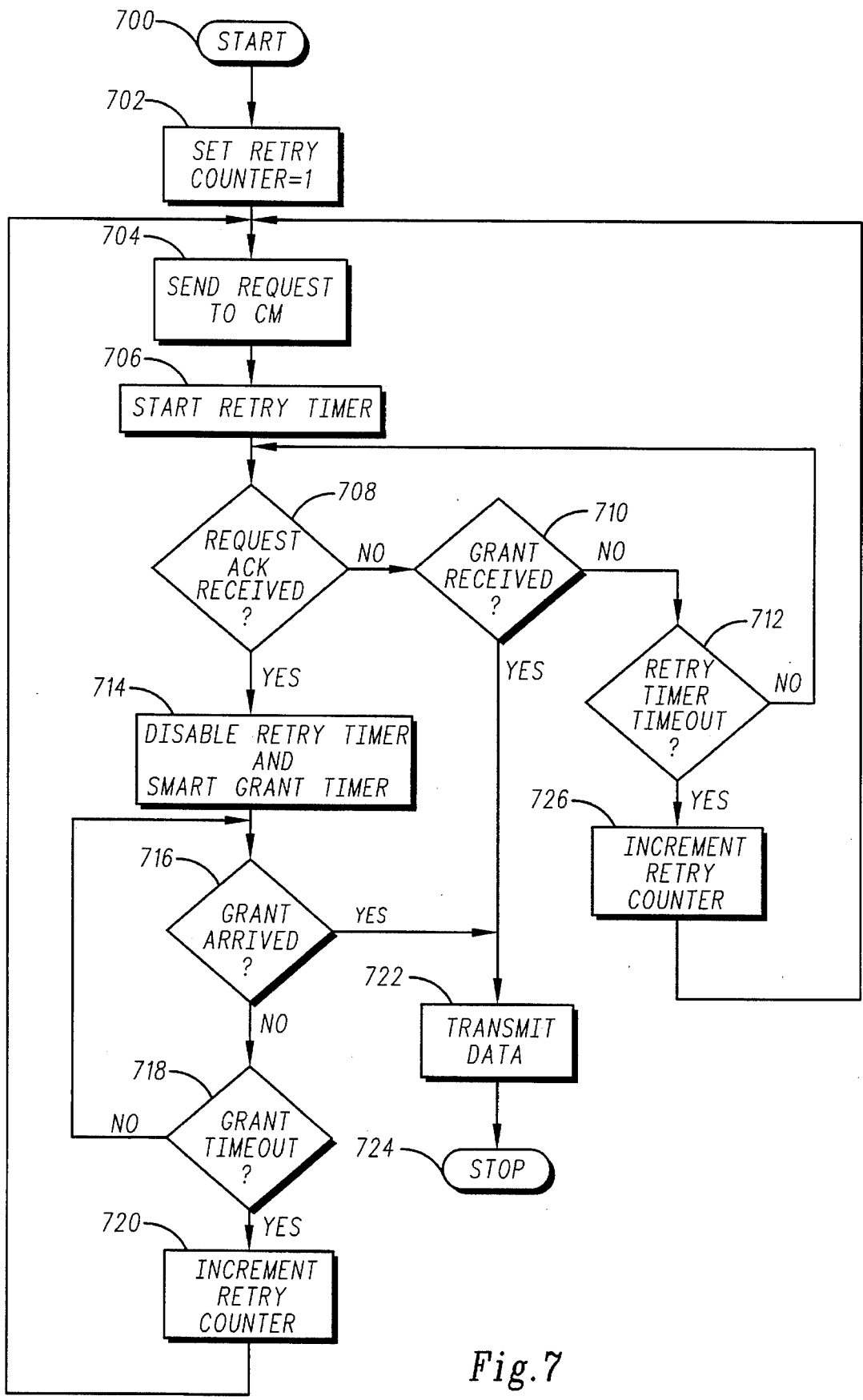
FIG. 7 is a flow diagram of the steps performed by the user module of FIG. 1 to reduce request traffic contention and the likelihood of resource misallocation.

FIG. 7 is a flow chart diagram of the steps performed by the communications controller 200 of UM 112 under direction and control of MPU 202 as programmed by system operating instructions stored in ROM 204 to reduce the likelihood of issuing multiple requests in the packet transmission system 100 of FIG. 1. Commencing with start block 700, flow proceeds to block 702 where the communications controller sets a RAM 206 retry counter to 1, indicating the count of the number of requests issued by UM 112. At block 704, the requesting UM sends a request to CM 110 via radio 228. At block 706, the controller 200 starts a retry timer having a duration determined by the following equation:

$$Q \text{ Uniform } (0, 2^{R-1})/S + T \quad\quad 1)$$

Where Q is the number of pending requests stored in memory that have not been serviced; R is the number of times a duplicate packet has been sent; T is a minimum amount of time required to assure CM 110 will respond to a request within the retry interval; and S is the number of time slots per TDMA frame available to UM 112 for requesting packet transmission services from CM 110. As will be appreciated, the function Uniform $(0,2^{R-1})$ provides a random value between 0 and $2^{R-1}$ based upon a uniform probability distribution.

In accordance with the preferred embodiment T is determined in accordance with the following equation:

$$T=(L-1)/(N-1) \quad\quad 2)$$

Where L is the length of the request queue 500 and N is the number of Grant time slots 306 per TDMA frame.

In accordance with the preferred embodiment, L is equal to 6 and N is equal to 2, thus T=5 TDMA frames or 10 msec. Upon expiration of the retry interval, the requesting UM 112 will issue a duplicate request as described herein below.

At decision block 708, a check is performed to determine whether a request acknowledgement has been received from CM 110. Assuming it has not, a check is performed at block 710 to determine whether a request grant has been received from CM 110. Assuming it has not a check is performed at block 712 to determine whether the retry timer set at block 706 has timed out (expired). Assuming it has not, flow branches back to decision block 708.

Assuming a request acknowledgment is received at decision block 708, flow proceeds to block 714 where the controller 200 disables the retry timer and starts a grant timer having a duration determined by the following equation:

$$Q \text{ Uniform } (0, 2^{R-1})/S + T_1 \quad\quad 3)$$

Where Q is the number of pending requests stored in memory that have not been serviced; R is the number of times a duplicate request has been transmitted; $T_1$ is a minimum amount of time required to assure CM 110 will respond to UM 112 with a grant, once CM 110 has transmitted a request ack; and S is the number of time slots per TDMA frame that are available to a UM 112 requesting packet transmission services from CM 110.

In accordance with the preferred embodiment $T_1$ is determined in accordance with the following equation:

$$T_1=N_1/N_2 \, (2L-1) \quad\quad 4)$$

Where $N_1$ is the number of Data time slots necessary to communicate a maximum size data packet, $N_2$ is the total number of Data time slots per TDMA frame, and L is the length of the request queue 500. In accordance with the preferred embodiment, $N_1$=4, $N_2$=4 and L=6. In accordance, $T_1$=11 TDMA frames or 22 msec. Upon expiration of the grant timer, the requesting UM 112 will issue a duplicate request as described herein below.

At decision block 716 a check is performed to determine whether an grant from CM 110 is received. Assuming it has not, flow proceeds to block 718 where a check is performed to determine whether the grant timer set at block 714 has timed out (expired). Assuming it has not, flow branches back to block 716. Assuming the grant timer expires prior to receipt of a grant from CM 110, flow proceeds to block 720, where RAM 206 retry counter is incremented and flow branches back to block 704 where UM 112 will issue a duplicate request.

Assuming a grant, received from CM 110, is detected at either decision block 710 or 716, flow proceeds to block 722, where the requesting UM 112 will utilize the available TDMA time slot to transmit data prior to commencing at step 724.

Assuming the retry timer expires at decision block 712, prior to receipt of a request acknowledgment or a grant from CM 110, flow will proceed to block 726 where the RAM 206 retry counter is incremented and flow branches back to block 704 where UM 112 will issue a duplicate request. By limiting the number of duplicate requests transmitted by UM 112, the present invention operates to reduces the likelihood request traffic contention and ultimately system resource misallocation. This approach is especially useful during periods of heavy traffic when CM 110 processing delays tend to cause UMs to issue multiple requests.

Figure 8:
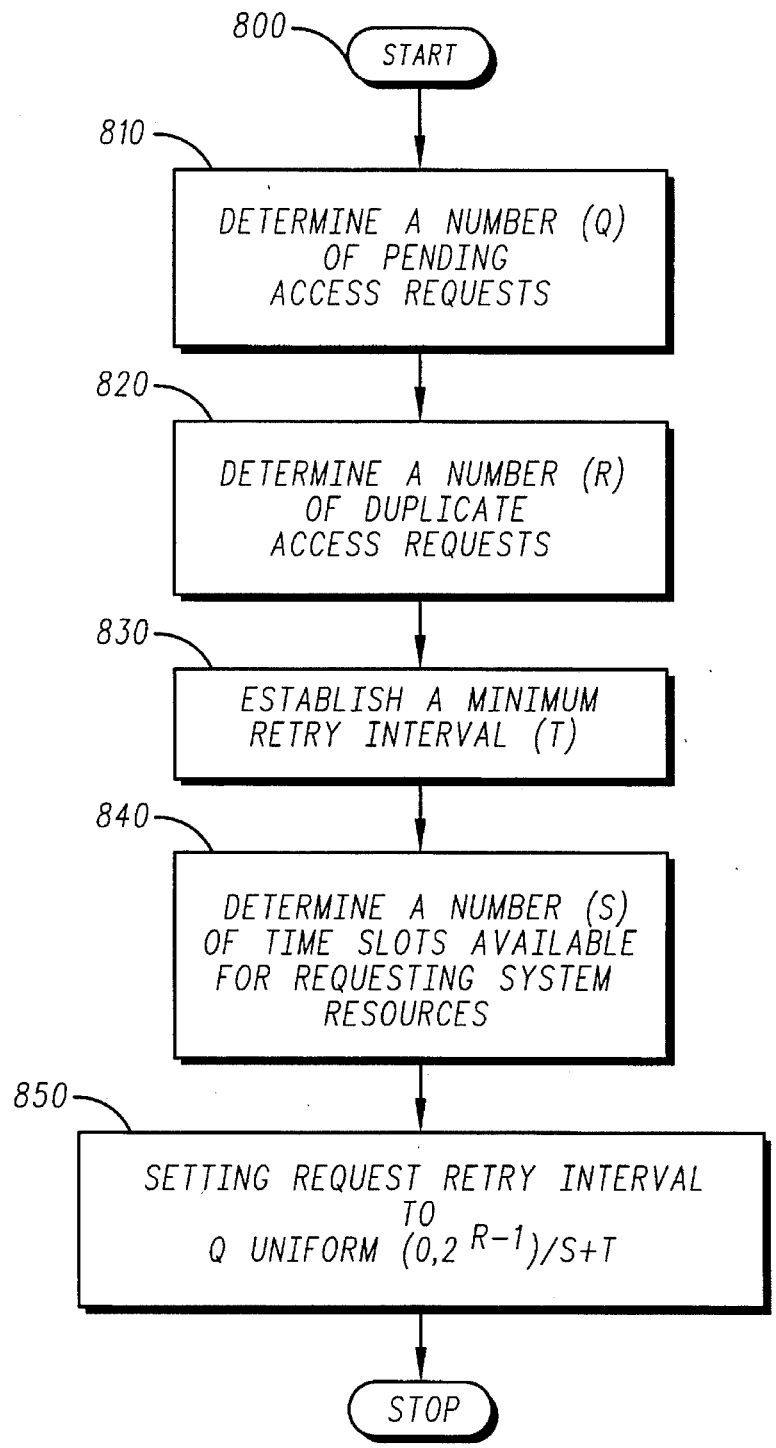
FIG. 8 is a flow diagram of the steps performed by the user module of FIG. 1 to set a request retry interval in accordance with the present invention.

FIG. 8 is a flow diagram of the steps performed by UMs 112 in order to set a request retry interval in accordance with the present invention. Commencing at start block 800, flow proceeds to block 810 where the MPU 202 of communications controller 200 of FIG. 2, reviews the request queue 500 to determine a number (Q) of outstanding requests stored therein. In accordance with the preferred embodiment, outstanding requests are those which have not been acknowledged by the CM. Thus, outstanding requests have yet to receive a respective request acknowledgement or a grant from the CM. It should be appreciated that receipt of a request acknowledgement by a UM, in association with a previously transmitted request, constitutes sufficient confirmation to remove that request from the ranks of the outstanding.

At block 820, the RAM 206 retry counter is queried to determine the number (R) of duplicate requests issued by UM 112 in association with this request. At block 830, a minimum retry interval is established in accordance with equation 2) above. At block 840, the frame structure 300 is monitored to determine a number (S) of time slots available to UM 112 for requesting system resources. At block 850, the request retry interval is set in accordance with equation 1) above.

Figure 9:
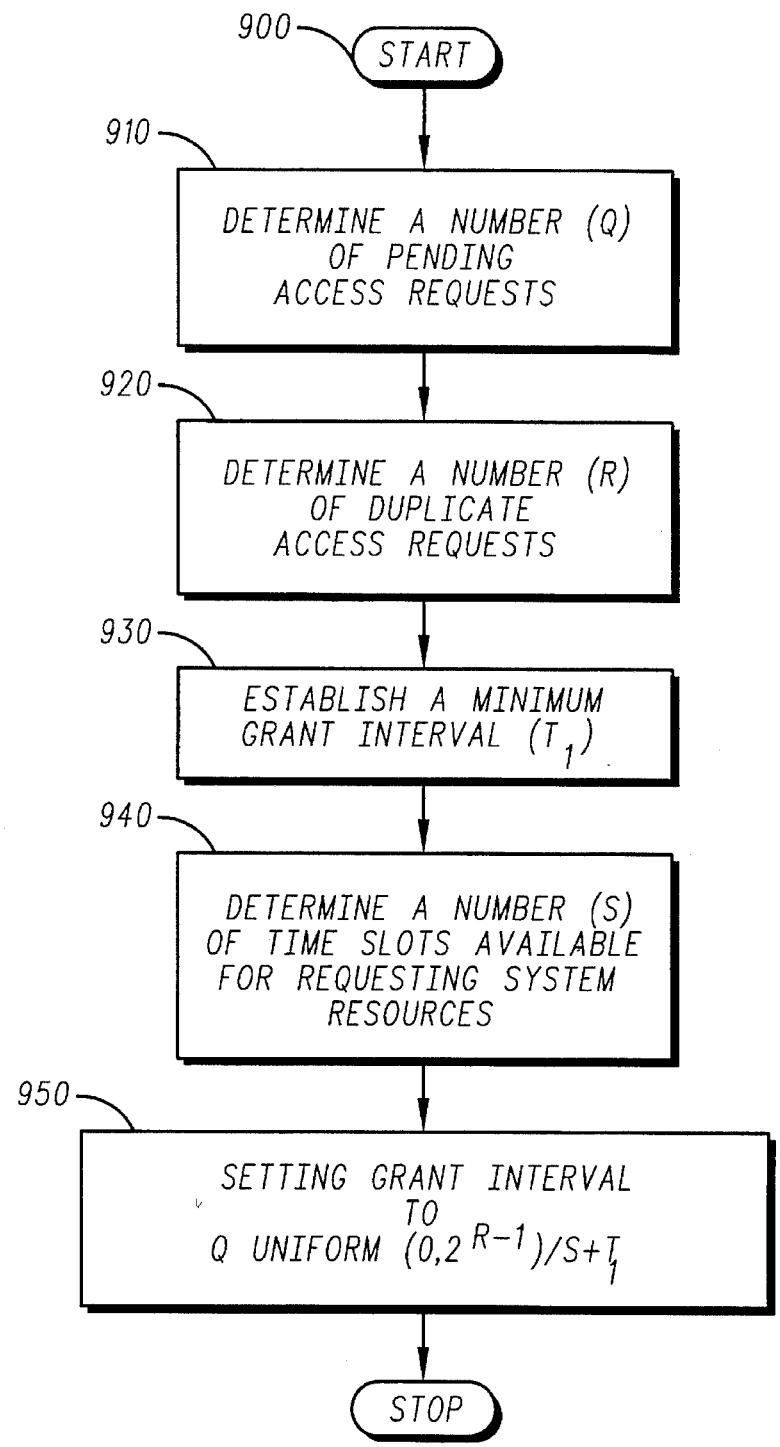
FIG. 9 is a flow diagram of the steps performed by the user module of FIG. 1 to set a grant interval in accordance with the present invention.

FIG. 9 is a flow diagram of the steps performed by UMs 112 in order to set a grant interval in accordance with the present invention. Commencing at start block 900, flow proceeds to block 910 where the MPU 202 of controller 200 of FIG. 2, reads request queue 500 to determine the number (Q) of outstanding requests. As previously stated, outstanding requests are those which have yet to receive either a request acknowledgement or a grant from the CM. At block 920, the RAM 206 retry counter is queried to determine the number (R) of duplicate requests issued by UM 112 in association with this request. At block 930, a minimum grant interval is established in accordance with equation 4) above.

At block 940, the frame structure 300 of FIG. 3 is monitored to determine a number (S) of time slots available to UM 112 for requesting system resources. Then, at block 950, the grant timer interval is set in accordance with equation 3) above.

By limiting the number of duplicate access requests transmitted by a UM 112, the present invention operates to reduce the likelihood of request traffic contention. As will be appreciated, one of the advantages realized by reduced contention is enhanced throughput due in part to a reduction in system processing and turnaround delays. Reduced contention in conjunction with the improved resource scheduling suggested by the present invention operates to further improve overall system throughput by reducing those delays associated with resource misallocation. This approach is especially useful during periods of heavy user traffic when the likelihood of request traffic contention is increased.

What is claimed is:

1. In a packet transmission system wherein a plurality of remote units request service from a communications controller by transmitting access requests to said controller, a method for reducing the likelihood of request contention and resource misallocation comprising the steps of:

at a remote unit:

transmitting an access request to the controller;

starting a first timer having a first interval determined as a function of a number of outstanding access requests issued by said remote unit; and awaiting receipt of an acknowledgment from the controller;

upon receipt of the acknowledgment, starting a second timer having a second interval greater in duration than the first interval; and transmitting a duplicate request upon expiration of the second timer; else transmitting a duplicate request upon expiration of the first timer when no acknowledgment was received.

2. The method of claim 1 wherein the packet transmission system is selected from the systems comprising: wire line, wireless, time-division multiple access (TDMA), digital and asynchronous communication systems.

3. The method of claim 1 wherein the step of starting the first timer further comprises the step of setting the first timer interval.

4. The method of claim 3 wherein the step of setting the first timer interval further comprises the steps of:

determining a number of outstanding requests;

determining a number of transmitted requests;

establishing a minimum retry interval time;

determining a number of time slots per TDMA frame available for requesting packet transmission services from the communications controller; and calculating the first interval as a function of Q Uniform $(0, 2^{R-1})/S+T$.

5. The method of claim 4 wherein the step of establishing a minimum retry interval further comprises the steps of:

providing a queue having a length for storing requests;

determining a number of time slots per TDMA frame available to transmit acknowledgements; and calculating the minimum retry interval time as a function of $(L-1)/(N-1)$.

6. The method of claim 1 further comprising the step of the remote unit disabling the first timer upon receipt of an acknowledgement.

7. The method of claim 1 wherein the step starting a second timer further comprises the step of setting a second timer interval.

8. The method of claim 7 wherein the the step of setting the second timer interval further comprises the steps of:

determining a number of outstanding requests;

determining a number of transmitted requests;

establishing a minimum grant timer interval;

determining a number of time slots per TDMA frame available for requesting packet transmission services from the communications controller; and calculating the second timer interval as a function of Q Uniform $(0, 2^{R-1})/S+ T_1$.

9. The method according to claim 8 wherein the step of establishing a minimum grant time interval further comprises the steps of:

providing a queue having a length for storing requests;

determining a number equal to a number of data slots necessary to communicate a maximum size data packet; and determining a number equal to a total number of data time slots per TDMA frame; and calculating the time as a function of $N_1/N_2 (2L-1)$.

10. The method of claim 1 further comprising the step of the remote unit transmitting data upon receipt of a grant from the controller.

11. The method of claim 1 further comprising the steps of:

at the communications controller:

receiving access requests from the remote units;

storing the requests in memory;

transmitting a grant to a remote unit upon receipt of a request when packet transmission resources are available; and transmitting a request acknowledgment to a remote unit upon receipt of a request when packet transmission resources are unavailable.

12. The method of claim 11 wherein the step of transmitting a grant further comprises the steps of:
monitoring a memory control block for available data and grant time slots within a TDM frame;
selecting an available grant time slot;
reserving an available data time slot for use by the remote unit; and
transmitting the grant to the remote unit via the selected grant time slot.

13. The method of claim 11 wherein the step of transmitting a request acknowledgment further comprises the steps of:
monitoring a memory control block for available communication resources;
selecting an available grant time slot within a TDM frame; and
transmitting the request acknowledgment via the selected grant time slot.

14. In a TDMA packet transmission system wherein a plurality of remote units request TDM resources from a communications controller within said system by transmitting access requests to said controller, a remote unit for reducing the likelihood of request contention and resource misallocation comprising:
a transmitter for transmitting access requests to the communications controller;
means, coupled to the transmitter, for starting a first timer having a first interval determined as a function of a number of outstanding access requests issued by said remote unit;
a receiver, coupled to the transmitter, for receiving an acknowledgment from the communications controller when packet transmission resources are unavailable;
means, coupled to the receiver and the first timer, for disabling the first timer and starting a second timer having an interval greater than the first interval, upon receipt of said acknowledgment;
the transmitter, being coupled to the first and second timer, for transmitting a duplicate request to the controller upon expiration of the first interval when no acknowledgment was received or the expiration of the second interval when an acknowledgment was received.

15. The system of claim 14 wherein TDM resources are selected from the group consisting of frequency spectrum and TDM time slots.

16. The system of claim 14 wherein the remote unit further comprises means for determining a number of outstanding requests; means for determining a number of transmitted requests; means for establishing a minimum retry interval time; means for determining a number of time slots per TDM frame available for requesting TDM resources from the communications controller; and means for calculating the first timer interval as a function of Q Uniform $(0,2^{R-1})/S+T$.

17. The system of claim 14 wherein the remote unit further comprises means for determining a number of outstanding requests; means for determining a number of transmitted requests; means for establishing a minimum grant interval time; means for determining a number of time slots per TDM frame available for requesting TDM resources from the communications controller; and means for calculating the second timer interval as a function of Q Uniform $(0,2^{R-1})/S+T_1$.

18. In a TDMA packet transmission system wherein a plurality of remote units request TDM resources from a communications controller by transmitting multiple requests to said controller, a method for reducing the likelihood of request traffic contention and TDM resource misallocation comprising the steps of:
at a remote unit:
transmitting a request and starting a first timer in response thereto, said first timer having a dynamic interval determined as a function of a number of outstanding requests issued by said remote unit;
awaiting an acknowledgment from the controller;
disabling the first timer and starting a second timer having a second interval greater in duration than the first interval, upon receipt of the acknowledgment; and
transmitting a duplicate request upon expiration of the second timer, else transmitting a duplicate request upon expiration of the first timer when no acknowledgment was received, thereby reducing the likelihood of request traffic contention; and
at the communications controller:
receiving requests from the remote unit;
storing the requests in memory;
transmitting a grant to the remote unit upon receipt of a request and when TDM resources are available; and
transmitting an acknowledgment to the remote unit upon receipt of a request and when TDM resources are unavailable, thereby reducing the likelihood of TDM resource misallocation.

* * * * *